United States Patent [19]

Saito

[11] Patent Number: 4,673,858

[45] Date of Patent: Jun. 16, 1987

[54] POWER CONVERTER FOR AC LOAD

[75] Inventor: Suzuo Saito, Tokyo, Japan

[73] Assignee: Kabushiki Kaisha Toshiba, Kawasaki, Japan

[21] Appl. No.: 743,364

[22] Filed: Jun. 11, 1985

[30] Foreign Application Priority Data

Jun. 11, 1984 [JP] Japan .................................. 59-119519
Jun. 11, 1984 [JP] Japan .................................. 59-119520

[51] Int. Cl.$^4$ ............................................. H02P 5/40
[52] U.S. Cl. .................................. 318/805; 318/798; 318/806
[58] Field of Search ......... 318/798, 805, 806, 807–811

[56] References Cited

U.S. PATENT DOCUMENTS

| 4,311,951 | 1/1982 | Walker et al. | 318/808 |
| 4,417,193 | 11/1983 | Hirata | 318/808 |
| 4,445,167 | 4/1984 | Okado | 318/811 |
| 4,532,464 | 7/1985 | Igarashi et al. | 318/798 |

Primary Examiner—David Smith, Jr.
Attorney, Agent, or Firm—Cushman, Darby & Cushman

[57] ABSTRACT

A power converter for driving an AC motor includes a main circuit and a control circuit such that: the main circuit includes a forward conversion circuit that forwardly converts AC power from an input AC power source into DC power, and an inverter circuit that inversely converts the thus forwardly converted and smoothed DC power into AC power of a specified voltage and frequency; the control circuit includes a calculation device that calculates a torque current component of the AC motor, a detection device that detects occurrence of an instantaneous interruption in the AC power source, a command device that commands a frequency to be fed into the AC motor, a control device that receives a signal relative to an output signal of the command device so as to control a terminal voltage of the AC motor, and a compensation device that adjusts the output signal of the command device so that the output signal of the calculation device is caused to be substantialloy zero in response to the output signal of the detection device.

11 Claims, 16 Drawing Figures

POWER CONVERTER FOR AC LOAD

BACKGROUND OF THE INVENTION

1. Field of Invention:

This invention relates in general to power converters. More specifically, the invention relates to power converters of the type used for driving an AC motor. The invention provides a power converter that provides a stable drive for the AC motor even when there is instantaneous power failure of an input AC power source of the converter. The term "instantaneous power failure" is meant to include an instantaneous voltage drop.

2. Description of the Prior Art

Power converters of various types are known. The present invention pertains to a power converter type generally referred to as a voltage inverter. The invention will be described using an induction motor as an example of a conventional AC motors to which AC power is supplied from the power converter according to the present invention. However, the invention is not to be considered as being limited to this specific example. It is only so described as a matter of convenience.

FIG. 1 (Prior Art) shows a main circuit configuration of a conventional voltage type inverter. AC power of an input AC power source 11 is converted to DC power by a forward conversion circuit 12, also referred to as a rectifier circuit. Ripple components of converted DC power are eliminated by a DC reactor 13 and a smoothing capacitor 14. Smoothed DC power is converted into AC power, which generally differs from the original AC power from source 11 in frequency and voltage.

AC conversion is carried out by an inverter circuit 15 which provides power to drive an induction motor 16. Inverter circuit 15 includes a plurality of a gate turn-off (GTO) devices. The detailed operation of such GTO devices is described in "Principle and Applications of Gate turn-off Thyristors" by Nagataka Seki, published by Denki Shoin. The description of circuit 15 per se is omitted, because it is not particularly significant for appreciation of the present invention and within the abilities of one of ordinary skill in the art to practice.

FIG. 2 (Prior Art) is a diagram illustrating the main circuit of FIG. 1 (Prior Art) and the control circuit thereof. A voltage controlled oscillator (VCO) 22, connected to a frequency reference setter 21, produces pulses with a frequency of six (6) times the inverter output frequency f in accordance with a frequency reference established by the frequency reference setter. An output of voltage controlled oscillator 22 is divided into the reference frequency f by a frequency divider 23, which in turn supplies an output to inverter circuit 15.

The frequency reference fr is also coupled, as a voltage reference, to a comparator 24 for comparison with a voltage feedback signal derived from a voltage detection circuit 25 provided with a transformer that detects the inverter output voltage and a rectifier that rectifies the thus detected voltage. The output from comparator 24 is coupled to a voltage control circuit 26 in which the thus compared result, i.e., an error voltage is amplified so as to be coupled as a phase reference into a phase control circuit 28. Phase control circuit 28 produces gate pulses according to the phase reference in synchronism with a phase signal derived from a transformer 27 that detects a voltage phase of the AC power source 11, so as to feed the same to the respective thyristor gates that constitute the rectifier circuit 12.

An instantaneous interruption detector 29 connected to the transformer 27 detects an instantaneous interruption of the AC power source 11 and judges that a power failure has occurred when the instantaneous interruption continues longer than a certain specified time. It then provides a signal to frequency divider 23 and phase control circuit 28 to stop operation of the inverter. The operations of the voltage type inverter shown in FIG. 2 (Prior Art) upon occurrence of instantaneous interruption will be described with reference to FIG. 3 (Prior Art) and FIG. 4 (Prior Art).

In FIG. 3, line (a) represents an instantaneous interruption signal $e_a$ detected by instantaneous detector 29 line (b) represents a charging voltage Ec of smoothing capacitor 14. Line (c) represents an inverter output current Io which is an AC current that flows into the induction motor from the inverter circuit 15 represented by a DC level, respectively.

FIG. 4 (Prior Art) is a diagram illustrating speed - torque characteristics of the induction motor 16, and the ordinate thereof represents a torque T, and the abscissa a speed N, respectively.

In FIG. 4 (Prior Art), the curve Qa represents a speed-torque characteristic in the case of normal operation, the curve Qb a speed - torque characteristic in the state of instantaneous interruption. Curve $Q_L$ represents a load - torque characteristic of induction motor 16, respectively. Assuming that when the induction motor 16 rotates at a speed of $n_1$ at a time $t_1$ should an instantaneous interruption occur, the charging voltage $E_c$ begins to decrease from time $t_1$. In this case, should a control be performed such that the inverter output frequency f corresponding to a synchronous speed $m_o$ is maintained constant, the inverter output current $I_o$ increases in order to obtain the same output level as before the instantaneous interruption, so that the charging voltage Ec decreases more significantly. At a time $t_2$, the induction motor 16 rotates with the speed - torque characteristic shown in curve Qb. After the speed of induction motor 16 reaches a speed $n_2$ (corresponds to the maximum torque), the induction motor loses speed, and its speed decreases in a free-run state.

Should the power recover at a time $t_3$ which is during the free-run state, a rush current appears and the smoothing capacitor 14 is overcharged because of the charging voltage. In this case, Ec of the smoothing capacitor 14 has been considerably reduced.

In addition to these disadvantages, there is another disadvantage. The ratio of voltage and frequency (hereinafter, referred to as v/f) of the induction motor 16 is reduced because of its lost speed. The flux thereof is not sufficiently established, because of its lost speed, when an attempt is made to operate with the v/f ratio previous to the instantaneous interruption. Therefore a rush current appears, resulting that both the main circuit and the control circuit become unstable. In addition to the aforementioned control system, the invention provides an arrangement whereby upon detection of an instantaneous interruption, the inverter output frequency is instantaneously reduced so as to establish a regenerative state whereby the charging voltage Ec of the smoothing capacitor 14 and the flux of the induction motor 16 are ensured. However, there still exists a disadvantage that the speed of the induction motor 16 reduces more rapidly than the natural deceleration during the period of instantaneous interruption.

Moreover, there has been provided a control circuit of FIG. 5 (Prior Art) that can continue a stable drive of an AC motor upon occurrence of an instantaneous interruption. In FIG. 5 (Prior Art), a speed reference wm* established by a setter 31 is fed into a comparator 32 so as to be compared with a speed feedback signal wm from a speed detector 16'. A speed control circuit 34 receives the thus compared result and amplifies the same so as to produce a torque current component comment $i_1q^*$. A flux reference $\phi^*$ established by a setter 35 is fed into a comparator 36 so as to be compared with a flux feedback signal $\phi$. The flux feedback signal $\phi$ is produced as a result of a calculation performed within a flux calculation circuit 39, which receives a terminal voltage $V_1$ of the induction motor 16 derived through a potential transformer 37 and a terminal current $i_1$ of the induction motor 16 derived through a current transformer 38 so as to perform the calculation. A flux control circuit 40 receives the compared result from the comparator 36, which is an error signal, and amplifies the same so as to produce an exciting current component command $i_1d^*$.

A current command calculation circuit 41 performs a calculations of $$|i_1o^*| = \sqrt{i_1q^{*2} + i_1d^{*2}}$$

$$\angle i_1o^* = \tan^{-1}(i_1q^*/i_1d^*)$$

so as to produce a current command $i_1 0^*$. In addition, a vector rotation device 42 performs a calculation of $$|i_1^*| = |i_1o^*|$$

$$\angle i_1^* = \angle i_1o^* + \angle U\phi$$

so as to produce a AC current command $i_1^*$. Here, the vector rotation device 42 receives a flux phase $U\phi$ from the above-described flux calculation circuit 39. A comparator 43 receives the AC current command $i_1^*$ so as to be compared with an actual current signal $i_1$. The thus compared result is fed into a PWM (pulse width modulation) control circuit 44 so as to produce ON-OFF signals which, in turn, are fed into the respective GTO thyristors within the inverter 15. On the other hand, an instantaneous interruption detection circuit 46 receives a voltage signal of the AC power source 11 through a potential transformer 45 so as to detect whether the received voltage signal exists above or below a specified instantaneous interruption level, and when detected as an instantaneous interruption, then produces an instantaneous interruption signal $e_a$.

In general, the control circuit of FIG. 5 has not sufficiently utilized the instantaneous interruption signal $e_a$. Namely, upon occurrence of instantaneous interruption, it is uncertain how long the operation of the system can continue by the accumulated charge on the smoothing capacitor 14, so that when the period of an instantaneous interruption exceeds a specified period, the operation of the system is usually stopped. This is also because of the configuration of the control circuit in FIG. 5 which functions in such a manner of so-called vector control based on an instantaneous value control, and should an attempt be made to successfully achieve a vector operation even upon occurrence of an instantaneous interruption, the control circuit would be extremely complicated. This has been another disadvantage hitherto.

SUMMARY OF THE INVENTION

Accordingly, one object of this invention is to provide a highly reliable power converter that responds well to an instantaneous interruption AC power is controlled so that there is no large rush current even upon recovery of power after the interruption. Both the main circuit and control circuit can be prevented from becoming unstable.

Another object of this invention is to provide a power converter wherein, during an instantaneous interruption, an AC motor driven by the power converter experiences no unnecessary speed reduction.

Another object of this invention is to provide a power converter wherein upon recovery of the power after an instantaneous interruption, an AC motor driven by the power converter can accelerate up to its original speed within a minimal time.

To achieve the above-described objects, the present invention provides a power converter which includes a AC power source, a forward conversion circuit connected to the AC power source, a filter circuit provided with at least a capacitor, and an inverter circuit that is connected to the filter circuit and converts the thus converted DC power into AC power to drive the AC motor. The power converter further includes a calculation device that calculates torque current components of the AC motor, a detection device that detects occurrence of an instantaneous interruption in the AC power source, a command device that commands a frequency to be fed into the AC motor, a control device that receives a signal relative to an output signal of the command device so as to control a terminal voltage of the AC motor, and a compensation device that adjusts an output signal of the command device in response to an output signal of the detection device so as to cause an output signal of the calculation circuit to be substantially zero.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings wherein.

DETAILED DESCRIPTION OF THE PREFERRED EMBODIMENTS

Figure 1:
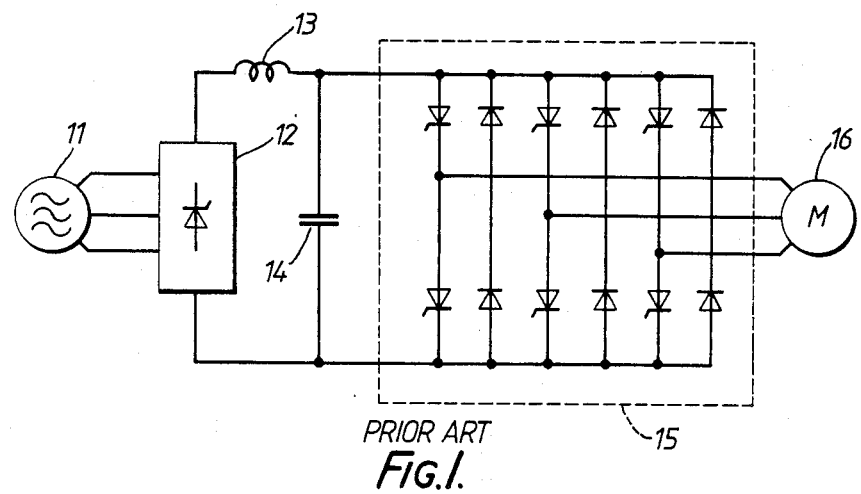
FIG. 1 (Prior Art) is a diagram illustrating a main circuit of a gate turn-off (GTO) inverter to be mainly embodied according to the present invention.
Figure 2:
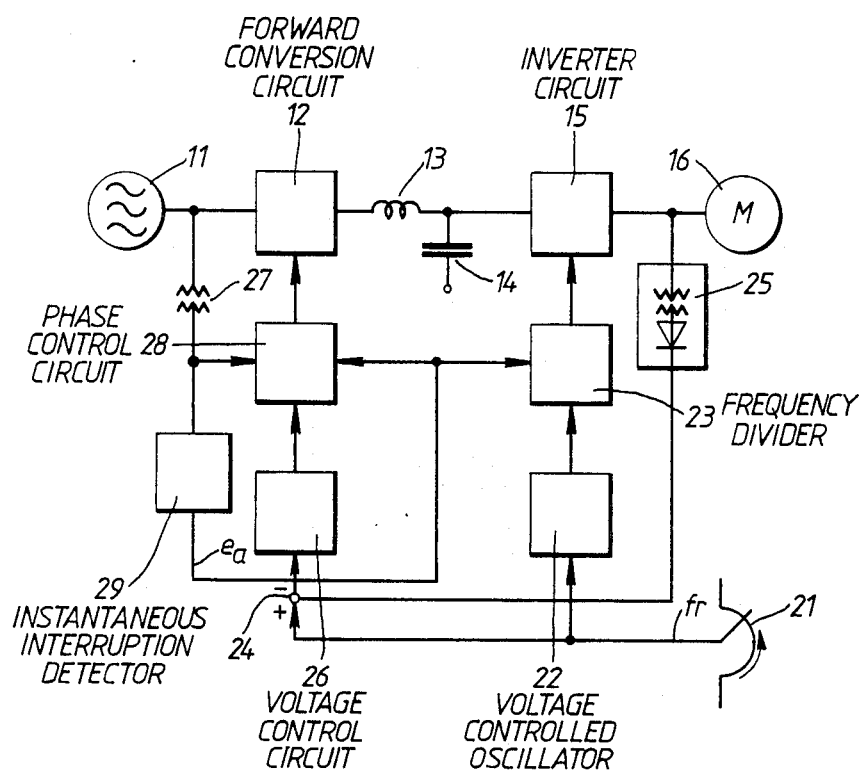
FIG. 2 (Prior Art) is a block diagram illustrating a conventional power converter.

Referring to the drawings, wherein like reference numerals designate identical or corresponding parts throughout the several views, and more particularly to FIG. 6, one embodiment of the present invention will be described. A flux phase calculation circuit 62 receives a terminal voltage of an induction motor 16 through a potential transformer Tr and a terminal current of the induction motor 16 through a current transformer 61 and produces a flux phase at a certain instant of time. A torque current component calculation circuit 63 receives an output signal of the flux phase calculation circuit 62 and a terminal current signal derived from the current transformer 61 and provides a torqe current component $i_1q$ of the induction motor 16. A setter 64 establishes a torque current component which is substantially zero. A comparator 65 compares the output of setter 64 with an output of torque current component calculation circuit 63. A torque current control circuit 66 amplifies the output of the comparator 65. A switch 67 operates in response to an instantaneous interruption signal $e_a$. An adder 68 that adds an output signal of the torque current control circuit 66 as a compensation signal to a frequency reference fr.

Figure 7:
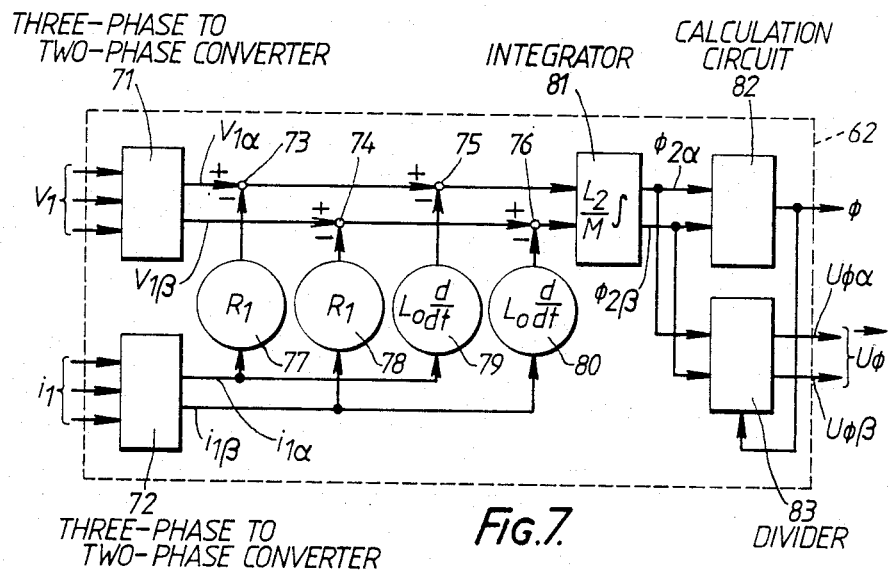
FIG. 7 is a block diagram illustrating a specific example of a flux phase calculation circuit shown in FIG. 5.

FIG. 7 shows one embodiment of the flux phase calculation circuit 62. In FIG. 7, a terminal voltage $V_1$ of the induction motor 16 received through the potential transformer Tr and a terminal current $i_1$ received through the current transformer 61 are respectively converted into two-phase signals by means of three-phase to two-phase converters 71 and 72. Here, an instantaneous flux can be obtained from the terminal voltage $V_1$ and the terminal current ig by performing a calculation of $$\vec{\phi_2} = L_2/M \int (\vec{V_1} - R_1\vec{i_1} - L_0 d/dt\, \vec{i_1}) dt$$

where $\phi_2$ represents a secondary flux vector, a primary (terminal) voltage vector, $i_1$ a primary (terminal) current vector, $L_2$ a secondary self inductance, M a mutual inductance, $R_1$ a primary resistance, and $L_o$ a leakage inductance, respectively.

Adders 73 through 76 together with multipliers 77 through 80 perform a calculation of $$V_1 - R_1 i_1 - L_0 d/dt\, i_1$$

and an integrator 81 performs a calculation of $$L_2/M \int$$

A calculation circuit 82 performs a calculation of $$\phi_2 = \sqrt{\phi_{2\alpha}^2 + \phi_{2\beta}^2}$$

so as to obtain a flux quantity.

A divider 83 performs a calculation of $$U\phi\alpha = \phi_{2\alpha}/\phi_2$$

$$U\phi\beta = \phi_{2\beta}/\phi_2$$

so as to produce unit vector components $v\phi_\alpha$ and $v\phi_\beta$ that represent the respective instantaneous flux phases.

Figure 8:
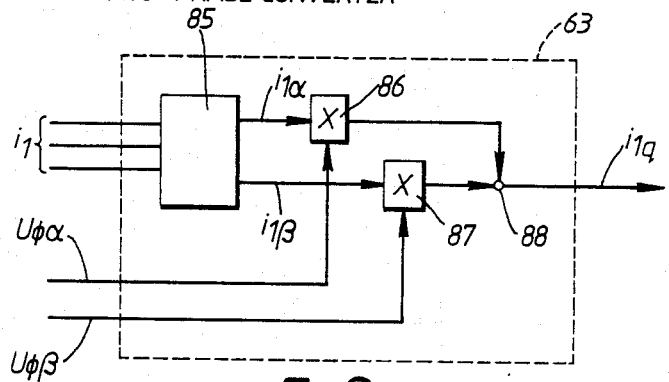
FIG. 8 is a block diagram illustrating one embodiment of a torque current component calculation circuit shown in FIG. 5.

FIG. 8 shows one embodiment of the torque current component calculation circuit 63. In FIG. 8, the terminal current $i_1$ is converted into a two-phase signal by a three-phase to two-phase converter 85, and thereafter, multipliers 86 and 87 together with an adder 88 perform a calculation so as to produce a torque current component $i_1g$ which is in a relationship perpendicular to a secondary flux torque.

Figure 9:
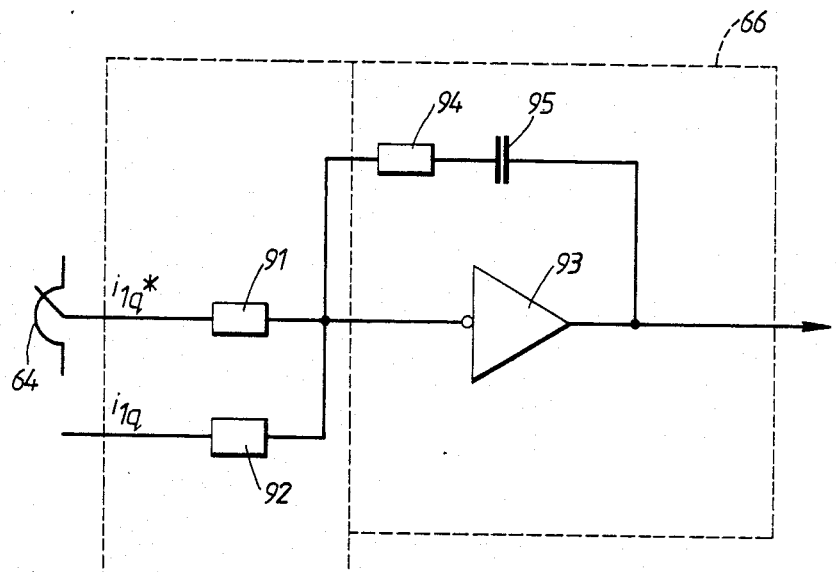
FIG. 9 is a diagram illustrating a specific circuit of a torque current control circuit shown in FIG. 5.

FIG. 9 shows a specific circuit of the torque current control circuit 66. In FIG. 9, a torque current reference $i_1q'^*$ established by the setter 64 and an output $i_1q$ of the torque current component calculation circuit 63 are fed through resistors 91 and 92 into the torque current control circuit 66, which is constituted by an operational amplifier 93 that receives a difference between the torque current reference $i_1q^*$ and the torque current component $i_1q$ and a series - connected feed back component of a resistor 94 and a capacitor 95 by which an output of the operational amplifier 93 is fed back. Namely, the torque current control circuit 66 is constituted as a proportion - integration circuit, the output thereof is supplied to one end of the switch 67.

Figure 3:
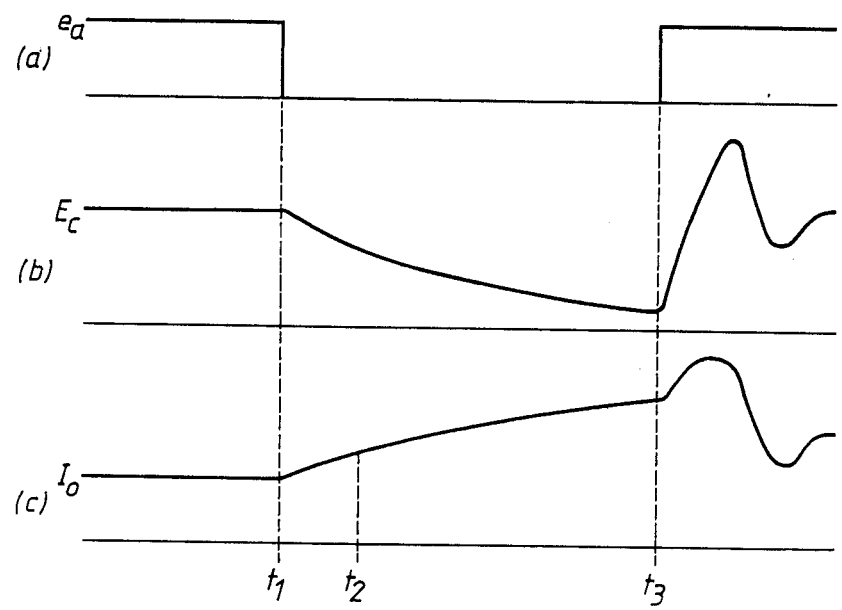
FIG. 3 (Prior Art) is a timing chart to explain the operations of the conventional power converter upon occurrence of an instantaneous interruption.
Figure 4:
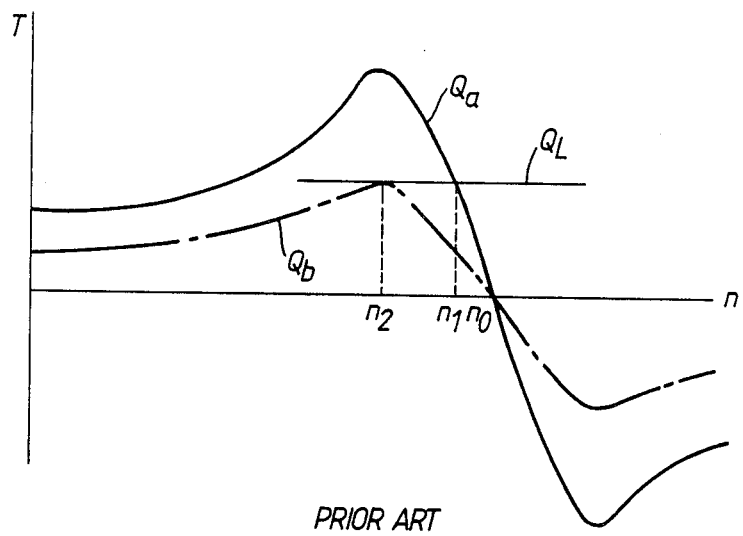
FIG. 4 (Prior Art) is a diagram illustrating transient speed - torque characteristics of the conventional power converter upon occurrence or an instantaneous interruption.
Figure 10:
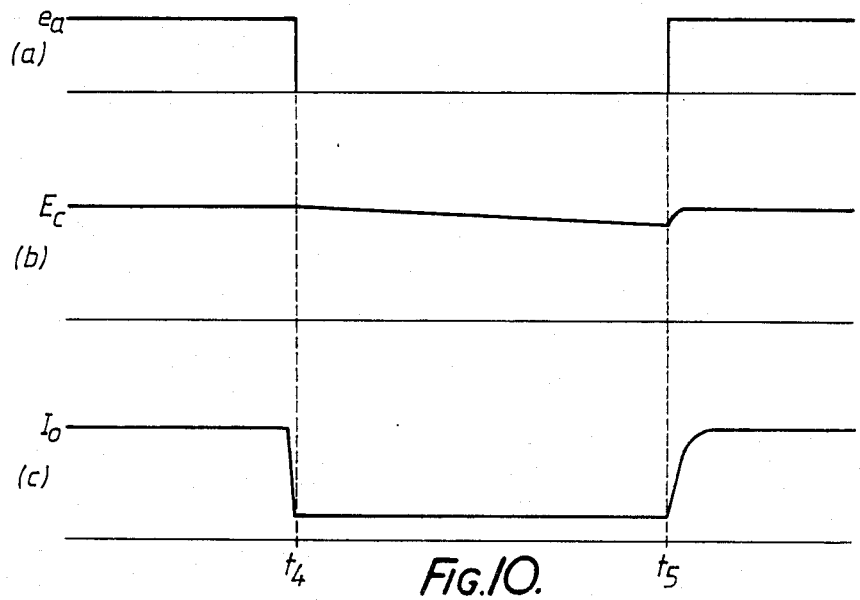
FIG. 10 is a timing chart to explain the operations of the power converter according to the present invention upon occurrence of an instantaneous interruption.
Figure 11:
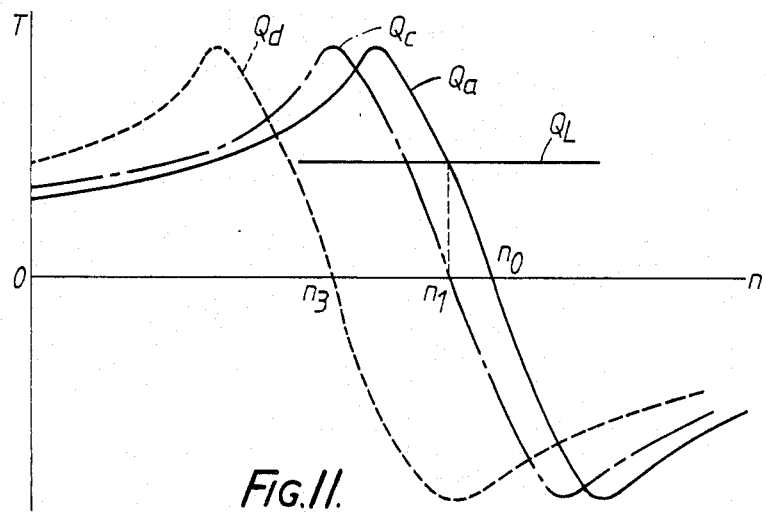
FIG. 11 is a diagram illustrating transient speed - torque characteristics of the power converter according to the present invention upon occurrence of an instantaneous interruption.

Hereinafter, the operations of the embodiment will be described with reference to FIG. 10 and FIG. 11. FIG. 10 is a diagram illustrating, in the same manner as in FIG. 3, an instantaneous interruption signal ea, a charging voltage $E_c$ and an inverter output current Io. FIG. 11 is a diagram illustrating variations in the speed-torque characteristics during the period of an instantaneous interruption.

Should an instantaneous interruption occur at a time $t_4$, frequency is controlled so as to cause a torque current component to be substantially zero as shown in the above-described embodiment so that an inverter output current Io operates so as to supply a current of the amount corresponding to an exciting current component of the induction motor 16. This means that, in FIG. 11, the characteristic curve Qa shifts to the characteristic curve Qc, then the induction motor 16 generates no torque, so that its speed decreases in a natural deceleration. Along with this deceleration, the characteristic curve Qc shifts to the characteristic curve Qd. A power factor of the exciting current is substantially zero, so that even when only the exciting current component is supplied during the period of instantaneous interruption, the power to be lost during this period is substantially zero. This is because the power of only the amount corresponding to the power loss developed within the circuit due to the flow of the exciting current component is lost. Therefore, the decrease of the charging voltage Ec can be suppressed to a considerably lower value.

As described above, the decrease of the charging voltage Ec developed during the period of the instantaneous interruption can be suppressed to a considerably lower value, so that a rush current upon recovery of the power can be suppressed to a considerably lower value and this also prevents a smoothing capacitor 14 from being overcharged.

In addition, even within the period of the instantaneous interruption, a normal value of v/f ratio is maintained so as to flow an exciting current of a specified amount, so that even upon recovery of the power, both the main circuit and the control circuit never have an unstable operation.

Further, the induction motor 16 never experiences a regenerative state during the period of an instantaneous interruption, so that the speed of the induction motor 16 never decreases more rapidly than natural deceleration. Consequently, even when re-accelerating after recovery of the power, the time required for the induction motor 16 to accelerate can be minimized.

Figure 6:
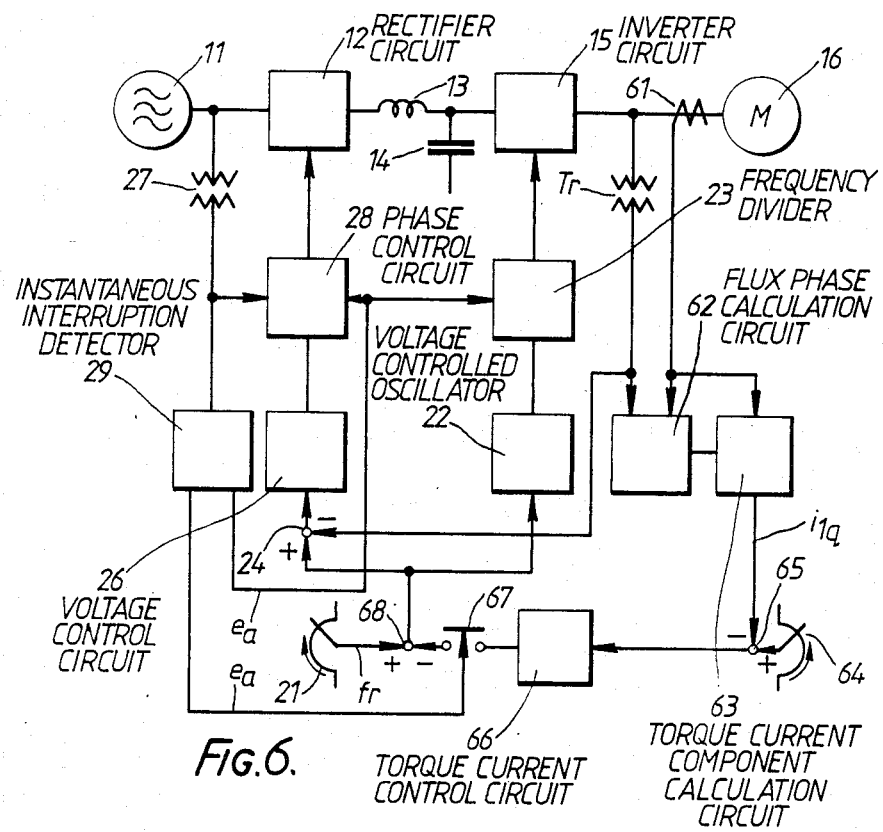
FIG. 6 is a diagram illustrating one embodiment of the present invention.
Figure 12:
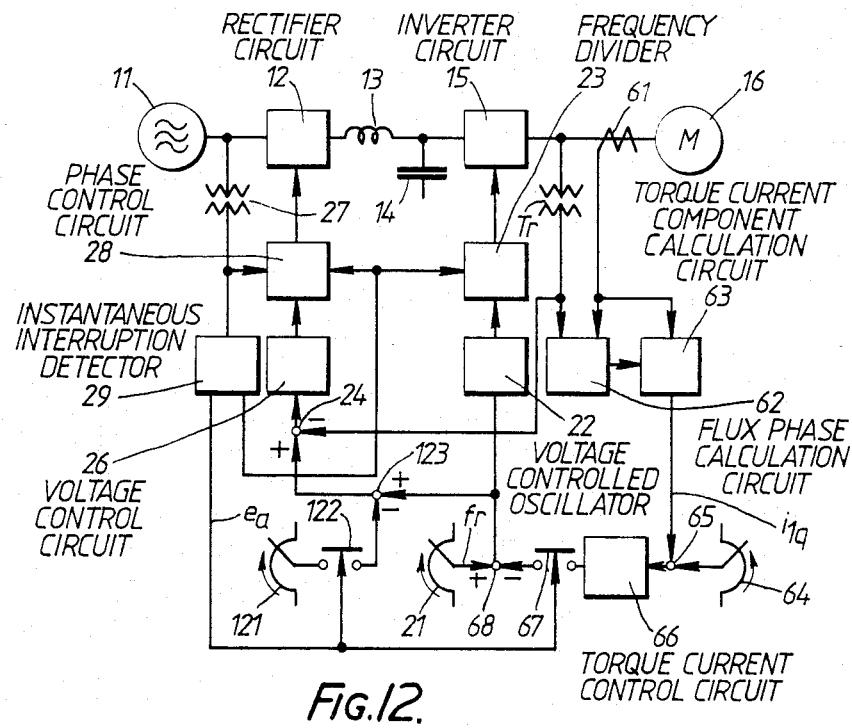

Next, FIG. 12 shows another embodiment of the present invention, which differs from the embodiment of FIG. 6 in that a voltage compensation signal established by a voltage compensation setter 121 is fed in response to a signal $e_a$ that represents the period of instantaneous interruption into an adder 123 through a switch 122 so as to be added to a voltage reference signal which is the output of the adder 68.

In the embodiment of FIG. 12, besides functions and advantages equivalent to those in the embodiment of FIG. 6, such a function can also be performed that the voltage compensation signal is added to the voltage reference signal during the instantaneous interruption. This voltage compensation signal is added so as to reduce the voltage reference signal, so that the value of v/f ratio during this period is reduced. Thus, the exciting current to be supplied to the induction motor 16 becomes smaller than that in normal operation.

Therefore, the exciting current during the instantaneous interruption becomes smaller, so that the power loss caused by flow of the exciting current can be suppressed to a further smaller value. Thus even in the case when the period of instantaneous interruption becomes longer, by use of this embodiment, the amount of decreasing the charge accumulated on the smoothing capacitor 14 is reduced. This is significantly more effective in terms of suppression of rush current compared to the embodiment of FIG. 6.

In FIG. 7, one embodiment of the flux phase calculation circuit has been illustrated, however, it is obvious that even when the flux phase is detected or calculated by use of a method other than this, the function thereof can similarly be achieved. For example, there can be obviously provided such a method that a plurality of flux detectors are installed within the induction motor 16 so as to directly detect the flux thereof, or that the primary current and speed of the induction motor 16 are utilized to calculate the flux thereof.

Furthermore, hereinbefore the description has been made as to one example such that the rectifier circuit 12 is operated in accordance with the frequency control loop, however, it is obvious that even when the rectifier circuit 12 is constituted by a diode pure bridge and the inverter circuit 15 is caused to peform a voltage control - frequency control, the same function can be similarly achieved.

Even in the case when the rectifier circuit 12 is constituted by an ordinary thyristor bridge, when the rectified DC voltage is controlled to be constant and the inverter circuit 15 is caused to perform an output voltage-frequency control, there can be provided functions and advantages similar to the case of the diode pure bridge. The embodiment of this case is shown in FIG. 13.

Figure 13:
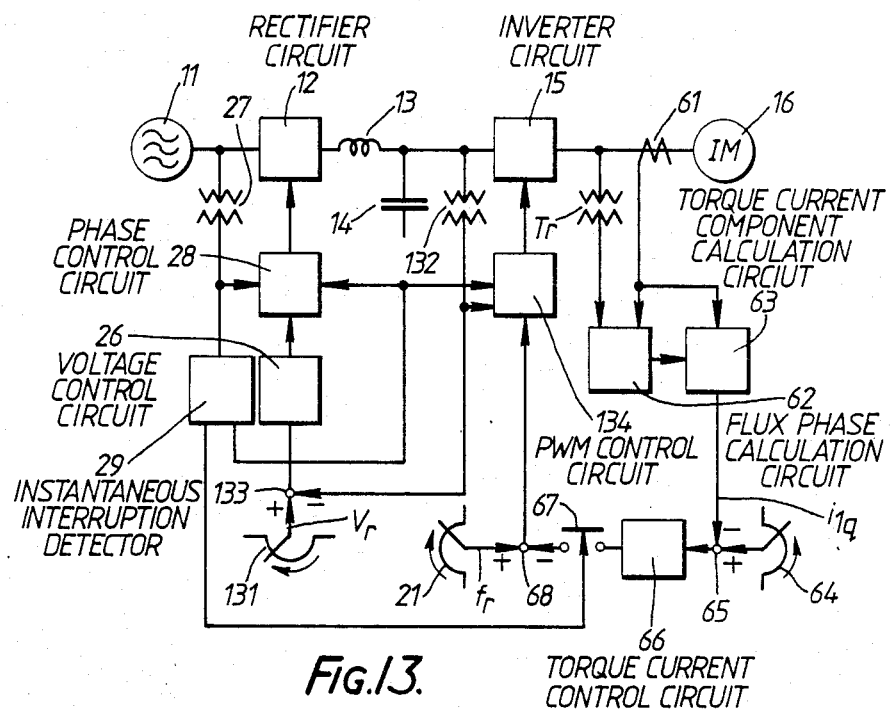
FIGS. 12-16 are diagrams, respectively, illustrating other embodiments of the present invention.

In FIG. 13, a voltage reference Vr established by a setter 131 is fed into a comparator 133 so as to be compared with a DC voltage feedback signal derived through a DC voltage detector 132, and the thus compared result is amplified by a voltage control circuit 26. The operations thereafter are identical to the aforementioned operations, so that the description thereof is omitted. By virtue of this configuration, the DC voltage which is the output of the rectifier circuit 12 is maintained constant.

A frequency reference fr is fed, after a compensation signal is added thereto at an adder 68, into a PWM (pulse width modulation) control circuit 134. The PWM control circuit 134 also receives a DC voltage signal from a DC voltage detector 132 so as to determine an optimum PWM pattern, and supplies gate pulses to an inverter circuit 15. In this embodiment, advantages similar to the aforementioned embodiments can also be achieved.

Figure 5:
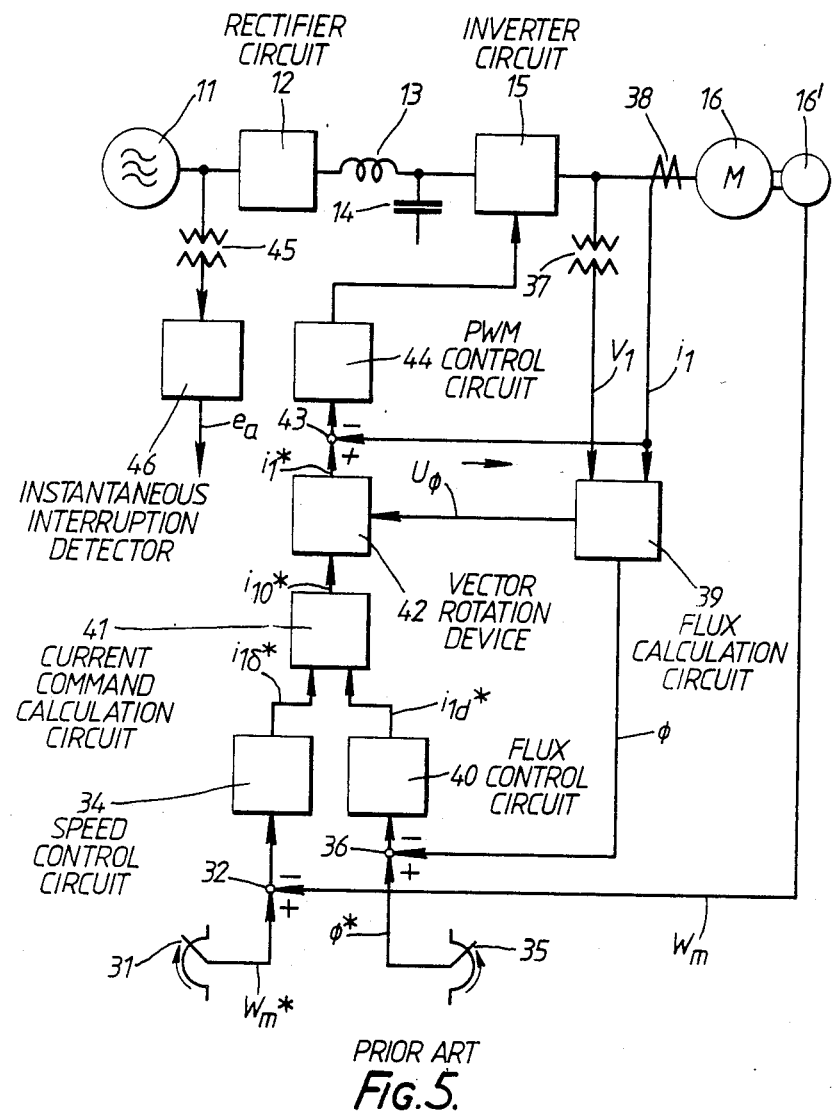
FIG. 5 (Prior Art) is a diagram illustrating the conventional power converter when a vector control is performed.
Figure 14:
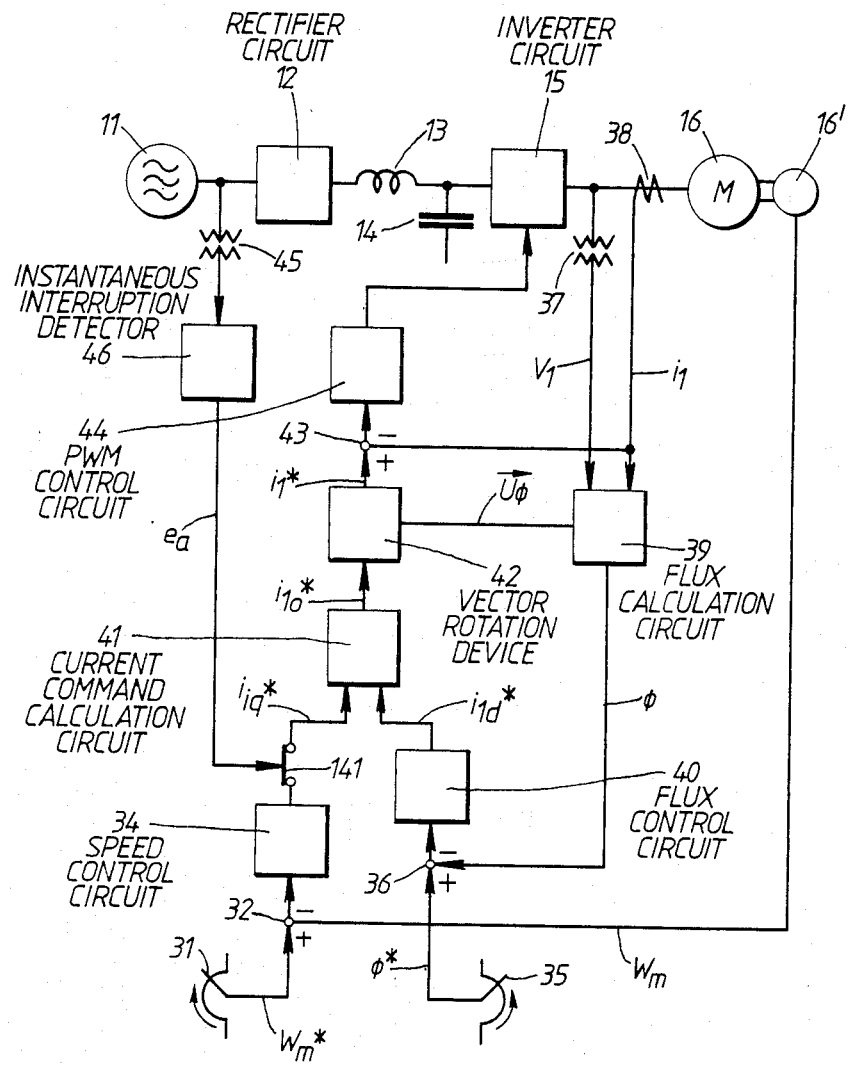

FIG. 14 shows another embodiment of the present invention, which differs from the embodiment of FIG. 5 in that a switch 141 that operates in response to an instantaneous interruption signal $e_a$ is installed between a speed control circuit 34 and a current command calculation circuit 41. In this configuration, upon occurrence of an instantaneous interruption, the switch 65 is caused to open in response to the instantaneous interruption signal $e_a$. This means that a torque current component command $i_1q^* = 0$ is fed into the current command calculation circuit 41. Thus a current command $i_1^*$ becomes as follows, $$|i_1^*| = |i_1d^*|$$

$$< i_1^* = \tan^{-1}(0/i_{id}^*) + < \nu\phi$$

$$= <\nu\phi$$

so that a current with a phase which coincides with a flux phase at this instant and of only the amount corresponding to the exciting current component is supplied to an induction motor 16. In this case, the induction motor 16 generates no torque, so that its speed reduces in a state of natural deceleration. However, during this deceleration, the instantaneous value control can still be continued, thus its flux remains established being ready for the state the induction motor 16 can be re-accelerated at any instant. Here, a power factor of the exciting current component is substantially zero. Thus, the amount of decreasing the charge accumulated on a smoothing capacitor 14 caused by flow of the exciting current component corresponds to the power loss developed within the circuit, so that this can be suppressed to an extremely small amount.

Therefore, it can be seen that even during the period of an instantaneous interruption, the induction motor 16 can continue a secured and stable operation with no limitation derived from the power converter side. This is because only with a condition in which the torque current component command is set to zero ($i_1q^* = 0$), the instantaneous value control can be performed with no influence, and the operation can be continued in the state with a minimal power loss. Moreover, based on this reason, the amount of decreasing the voltage on the smoothing capacitor 14 can be suppressed to a smaller value, so that a rush current upon recovery of the power can be smaller, and the induction motor 16 can be accelerated up to its original speed within a minimal time.

In this embodiment, the switch 141 is installed so as to perform compensation that the torque current component command $i_1q^*$ becomes zero upon occurrence of an instantaneous interruption. However, besides this, when there is provided an output limit circuit (not shown), for example, in parallel with a speed control circuit 34 so that the output signal thereof is limited only upon occurrence of an instantaneous interruption, the same advantages as described above can also be achieved.

Figure 15:
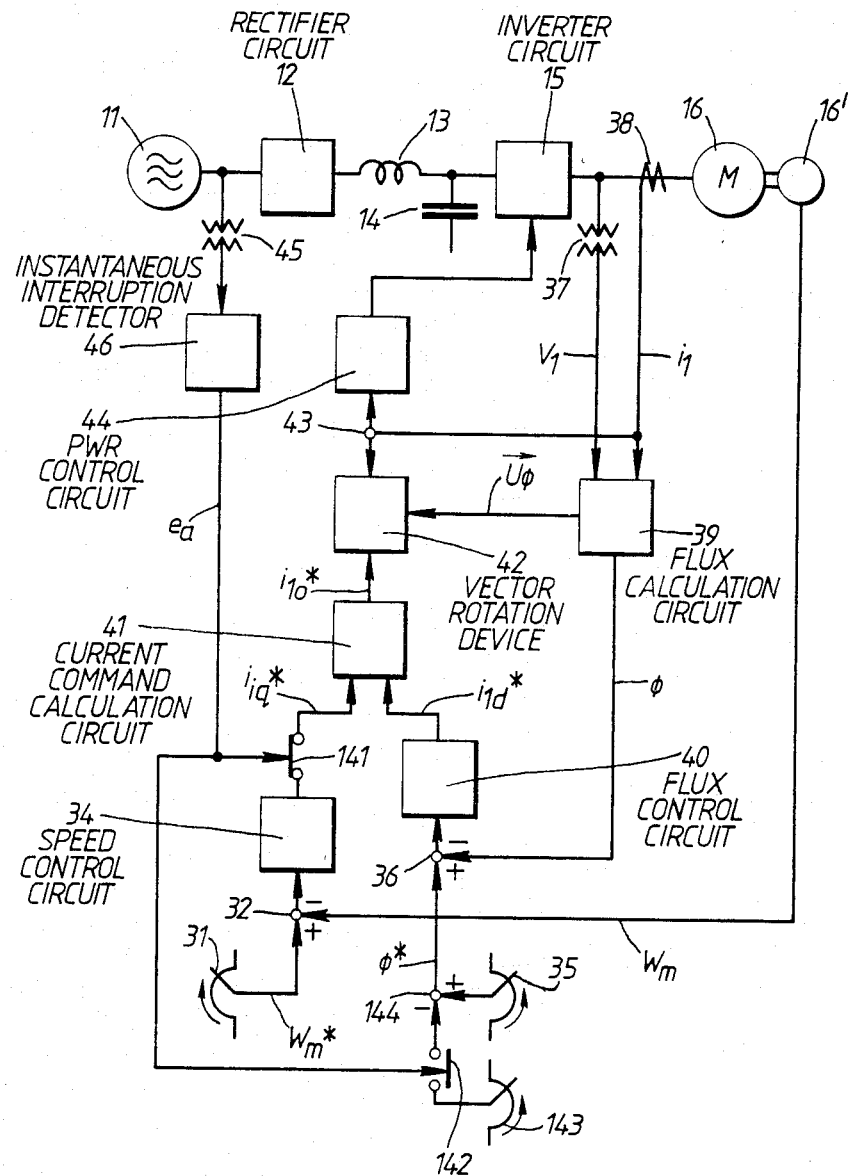

FIG. 15 shows another embodiment of the present invention, which differs from the embodiment of FIG. 14 in that a switch 142 that operates in response to an instantaneous interruption $e_a$ is additionally provided to add a flux compensation signal established by a setter 143 to the inherent flux reference at an adder 144 so as to produce a new flux reference $\phi^*$.

This configuration can perform functions more than that in the embodiment of FIG. 14 such that during the period of an instantaneous interruption, the flux compensation signal is added so as to reduce the flux reference, so that an exciting current being supplied to the induction motor 16 during this period becomes smaller than the exciting current in normal operation.

Therefore, the exciting current during the period of instantaneous interruption becomes smaller, so that the power loss caused by the flow of exciting current can be suppressed to smaller value. Further, when the period of instantaneous interruption becomes longer, the use of this embodiment becomes more advantages to achieve a secured and stable operation.

Figure 16:
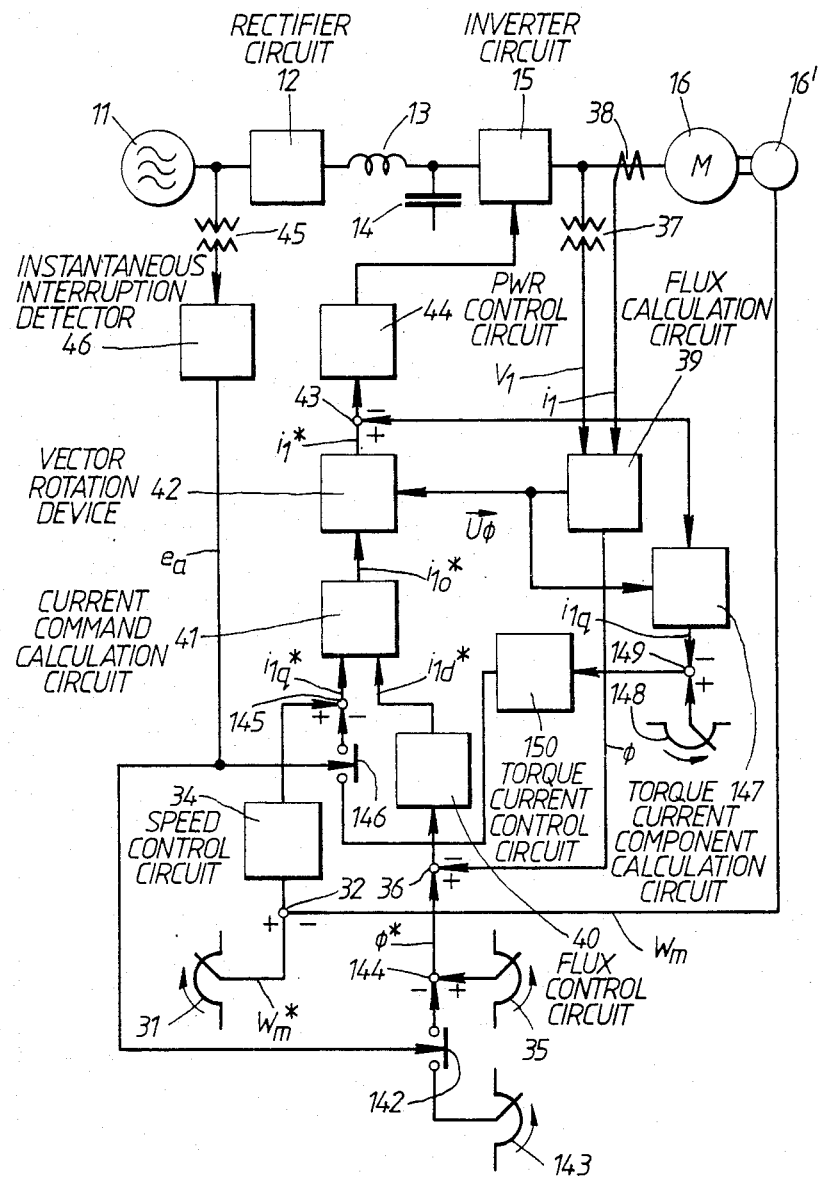

FIG. 16 shows another embodiment of the present invention, which differs from the embodiment of FIG. 15 in that instead of the switch 141, an adder 145 is provided to add a torque current component compensation signal derived through a switch 146 to the inherent torque current component command so as to produce a torque current component command $i_1q^*$.

Here, the torque current component compensation signal is obtained by such a configuration that there is provided a torque current component calculation circuit 147 that receives the current $i_1$ of the induction motor 16 and the flux phase signal $\nu\phi$ which is the output signal of the flux calculation circuit 39 so as to produce an actual torque current component $i_1q$ of the induction motor 16. The torque current component calculation circuit 147 has the same constitution as that is shown in FIG. 8. Further, there are provided a comparator 149 that receives a zero torque current component reference established by a setter 148 and the output signal $i_1q$ of the torque current component calculation circuit 147 to perform comparison, and a torque current control circuit 150 that receives the thus compared output from the comparator 149 to amplify the same so as to supply the thus amplified signal to one end of a switch 146.

In the embodiment of FIG. 16, the torque current component compensation signal to be fed in response to an instantaneous interruption signal $e_a$ to the torque current component command is produced on the basis of the torque current component $i_1q$ which is actually calculated. Namely, the output signal of the torque current control circuit 150, i.e., the torque current component compensation signal is produced such that the actual torque current component $i_1q$ which is obtained as the output signal of the torque current component calculation circuit 147 is controlled so as to directly be zero.

In the embodiment of FIG. 14, the compensation circuit is constituted on the basis of the assumption that the torque current component flows in accordance with the torque current component reference, however, in an actual power converter, there exist cases when the main circuit cannot be regarded as a power amplifier with no lag in response because of fluctuations in the voltage or lags in switching operation. In such cases a torque current component reference differs from an actual value. Thus, in the embodiment of FIG. 16, an actual torque current component is detected and controlled so as to be zero by feeding the compensation signal thereto, whereby the non-linearity of the main circuit can also be compensated. Consequently, in this embodiment, a control of higher accuracy can be achieved compared to the embodiments of FIG. 14 and FIG. 15.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A power converter for converting a first AC power from an AC power source to a second AC power for a load comprising:
   forward conversion means, connected to the AC power source, for converting said first AC power into a DC power;
   filter means, connected to the forward conversion means and including at least a capacitor, for filtering said DC power;
   inverter means, connected to the filter means, for converting the DC power into said second AC power and adapted for driving the load;
   calculation means, coupled to said second AC power, for calculating a torque current component of the load from a voltage and a current thereof;
   detection means for detecing an occurrence of an instantaneous interruption in the AC power source and producing an output signal indicative thereof;
   command means, coupled to said inverter means, for commanding a frequency of said second AC power by producing a command output signal;
   control means, coupled to said command means and said inverter means, for controlling said voltage of said load in accordance with said command output signal of said command means and a reference value; and
   first compensation means for compensating the command output signal of said command means so that said torque-current component of the load as indicated by the output signal of said calculation means becomes substantially zero in response to said output signal of said detection means.

2. A power converter according to claim 1, wherein said calculation means includes:
   first converter means for converting the three-phase terminal voltage of the AC motor into a two-phase voltage;
   second converter means for converting the three-phase terminal current of the AC motor into a two-phase current;
   first calculation means for calculating a secondary flux vector of the AC motor from the output signals of said first converter means and said second converter means;

second calculation means for calculating an absolute value from the secondary flux vector calculated within said first calculation means;

third calculation means for calculating an instantaneous flux phase signal from the secondary flux vector and the absolute value thereof derived respectively from said first and second calculation means; and fourth calculation means for calculating a torque current component of the AC motor from the instantaneous flux phase signal calculated within said third calculation means and from the two-phase current derived within said second converter means.

3. A power converter according to claim 1, further comprising:

second compensation means for reducing the reference value of said control means to a certain specified value in response to the output signal of said detection means.

4. A power converter comprising:

an AC power terminal which has a first AC power thereupon;

forward conversion means, connected to the AC power terminal, for forwardly converting a first AC power therefrom into a DC power;

a filter circuit connected to the forward conversion means and provided with at least a capacitor;

inverter means, connected to the filter circuit, for converting the forwardly converted DC power into a second AC power to drive an AC motor;

first command means, coupled to said inverter means, for commanding a first torque-current component of the AC motor on the basis of a speed reference of the AC motor and a speed of the AC motor;

second command means, coupled to said inverter means, for commanding an exciting current component of the AC motor on the basis of a flux reference of the AC motor, and a three-phase terminal voltage and a three-phase terminal current of the AC motor;

detection means, coupled to said AC power terminal, for detecting an occurrence of an instantaneous interruption in the AC power to produce a detection signal;

first compensation means for producing a compensated signal which is: (1) said first torque current component when the detection signal is not applied, and (2) substantially zero when the detection signal is applied; and third command means, coupled to said inverter means, said first compensation means and said second command means, for commanding an output voltage and a frequency of the inverter means on the basis of the compensated signal from said first compensation means and the exciting current component from said second command means.

5. A power converter according to claim 4, further comprising:

second compensation means for reducing the exciting current component to a certain specified value in response to the detection signal of said detection means.

6. A power converter according to claim 5, further comprising:

third compensation means for calculating a second torque current component of the AC motor from the three-phase terminal voltage and the three-phase terminal current of the AC motor, and wherein said first compensation means further includes means for adding the first torque current component to the second torque current component to produce an added signal which is substantially zero, and means for producing said first torque current component as said compensated signal when the detection signal is not applied and said added signal as said compensated signal when said detection signal is applied.

7. A power converter as in claim 1 wherein said second AC power is three-phase power.

8. A power converter as in claim 7 wherein said load is a three-phase AC motor.

9. A power converter as in claim 7 further comprising a three-phase AC motor as said load.

10. A power conversion circuit for converting a first AC power into a second AC power which is intended to be coupled to a load, comprising:

forward conversion means, adapted to be coupled to a first AC power, for converting said first AC power to a rectified DC power;

voltage controlling means, coupled to said forward conversion means, for controlling an output voltage amount of said rectified DC;

filtering means, coupled to said rectified DC, for filtering said rectified DC into a filtered DC, said filtering means including capacitor means for storing a charge of said rectified DC;

inverter means, coupled to said filtered DC, for converting said filtered DC into a second AC;

torque-current calculation means, coupled to said second AC power, for determining a torque to current relationship of said load;

detection means coupled to said first AC power for detecting an interruption in said first AC power; and torque to current control means, coupled to said detection means, said voltage controlling means, and said torque-current calculation means, for commanding a frequency of said frequency controlling means to a value such that said output signal of said torque-current calculation means indicates a torque-current relationship of substantially zero when an interruption in said first AC power is detected by said detection means.

11. A method for controlling a power converter, comprising the steps of:

converting a first AC power into a DC power;

filtering the DC power and charging a capacitor to a charged DC voltage;

converting the filtered power into a second AC power, and coupling the second AC power to a motor;

calculating a torque-current component of the motor from a voltage and a current supplied to the motor;

detecting an interruption in the first AC power; and controlling the frequency of the second AC power produced in said converting step such that the detected torque-current component becomes substantially equal to zero.

* * * * *